United States Patent [19]

Stetson

[11] 4,218,721

[45] Aug. 19, 1980

[54] HEAT TRANSFER SYSTEM FOR VOLTAGE SURGE ARRESTERS

[75] Inventor: Earl W. Stetson, Pittsfield, Mass.

[73] Assignee: General Electric Company, N.Y.

[21] Appl. No.: 2,858

[22] Filed: Jan. 12, 1979

[51] Int. Cl.² .................... H02H 9/04

[52] U.S. Cl. .................... 361/117; 361/127

[58] Field of Search .................... 317/117, 126, 127, 128

[56] References Cited

U.S. PATENT DOCUMENTS

| | | | |
|---|---|---|---|
| 4,092,694 | 5/1978 | Stetson | 361/126 |
| 4,100,588 | 7/1978 | Kresge | 361/127 |

*Primary Examiner*—Harry E. Moose, Jr.

*Attorney, Agent, or Firm*—Francis X. Doyle; Richard A. Menelly

[57] ABSTRACT

A heat transfer system for voltage surge arresters employs a dual radius arrester housing in combination with a plurality of sleeved zinc oxide varistors to efficiently cool the varistors during operation. The sleeved varistors are held in thermal contact with a large portion of the porcelain housing. The porcelain housing provides a heat sink facility to the arrester both during normal operating and voltage surge conditions.

12 Claims, 13 Drawing Figures

15
10
18
19
PRIOR ART
21
17

HEAT TRANSFER SYSTEM FOR VOLTAGE SURGE ARRESTERS

BACKGROUND OF THE INVENTION

Zinc oxide varistors are employed in voltage surge arrester devices for shunting surge currents while maintaining the ability to operate under line voltage conditions. These varistors have a high exponent "n" in the voltage current relationship $I=KV^n$ for a varistor, where I is the current through the varistors, K is a constant and V is the voltage across the varistor. High exponent zinc oxide compound varistors can have sufficient resistance at normal line voltage to limit the current through the varistor to a low value, but resistance at high currents is such that the varistor voltage with surge current flowing is held to a level low enough to prevent damage to the insulation of the equipment being protected by the varistor.

Because the varistors are continuously connected from line-to-ground a continuous current flows through the varistor, and the current causes a small amount of power to be dissipated by the varistors at normal system voltage and a normal operating temperature. The magnitude of both the current and the resulting power increases as the varistor temperature increases. Some means must therefore be provided to remove heat from the varistor to prevent thermal runaway. The means must not only be capable of preventing thermal runaway under normal conditions, but it must also be capable of dissipating the heat resulting from high current surges. One effective means for removing heat from the varistor bodies employs an aluminum oxide filled silicone resin. Each individual varistor disc is cast within a thick quantity of the resin material prior to insertion within the surge arrester housing. The thick silicone material acts as a heat sink and eventually the heat is carried to the walls of the surge arrester body. The use of a silicone encapsulant for heat sinking zinc oxide varistors is described within U.S. Pat. Nos. 4,092,694 and 4,100,588.

Another method for cooling zinc oxide varistor discs is described within U.S. patent application Ser. No. 939,792, wherein zinc oxide varistor discs are fitted with a metal disc heat sink held in place by means of a flexible elastic sleeve. The metal disc-varistor combination is held in thermal contact within the surge arrester body by means of a resilient positioning member and axially applied spring force. The metal disc rapidly removes heat from the varistor body during surge conditions and transmits the heat to the heat radiating arrester housing through the flexible elastic sleeve surrounding both the varistor body and the metal disc. The thickness of metal discs required results in an arrester housing of significantly greater length. Controlling the length of the housing is an important consideration in surge arrester design because wind loading and earthquake resistance strongly depend upon housing length. In addition surge arrester cost and weight increase with arrester length. The purpose of this invention is to provide an efficient heat transfer assembly with surge arrester housings of reasonable length having superior heat transfer properties.

SUMMARY OF THE INVENTION

A dual radius surge arrester housing multi-functionally houses a plurality of zinc oxide varistors and heat sinks the varistors during normal operating, over voltage, and surge current conditions. A flexible elastic sleeve surrounding each varistor provides effective thermal contact with a large area of the interior arrester housing wall.

GENERAL DESCRIPTION OF THE PRIOR ART

Figures 1, 2, 3:
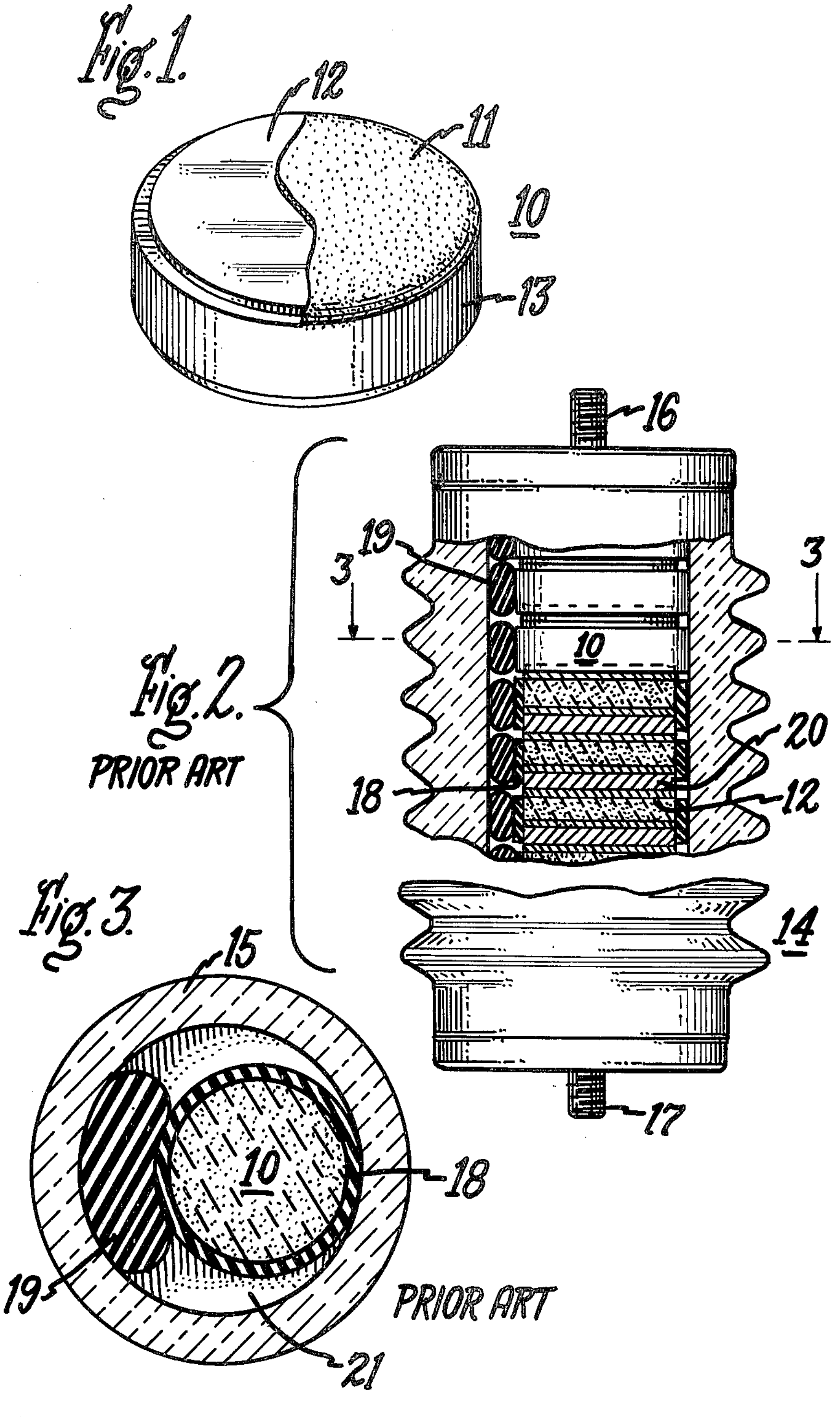
Fig. 2. PRIOR ART
FIG. 1 is a top perspective view of a zinc oxide varistor for use within the heat transfer system of the invention.
FIG. 2 is a side view in partial section of a prior art voltage surge arrester assembly.
FIG. 3 is a cross sectional view of the heat transfer arrangement of FIG. 2.

The invention relates, in general, to zinc oxide varistors such as varistor 10 shown in FIG. 1 and consisting of a sintered disc of zinc oxide material 11 having an insulated ceramic collar 13 around the periphery of the disc and a pair of top and bottom electrodes 12 on opposing surfaces. When the varistors are used for surge voltage protection they are generally contained within an arrester 14 shown in FIG. 2, which consists of a porcelain housing 15 having a pair of top and bottom terminals 16, 17 for providing electrical access to a plurality of varistors 10 within the housing. This arrester is shown for comparison purposes with the heat transfer arrangement according to the invention. The heat transfer mechanism of FIG. 2, as described in the aforementioned U.S. Patent Application which is incorporated herein by way of reference, comprises an elastic sleeve 18 surrounding the varistor 10 and metal heat sink 20 and contacting a positioner 19 at one side, and, the internal wall of porcelain housing 15 at the other side. The metal heat sink rapidly removes heat from the varistor and transfers the heat through silicone sleeve 18 to the housing where it becomes dissipated to the surrounding environment. The mechanism of heat transfer from the varistor and the heat sink to the porcelain housing can be seen by referring now to FIG. 3. The positioner 19 forces the varistor and metal heat sink which, is attached to the bottom of the varistor, into thermal contact with the internal wall of housing 15. The heat then passes from the varistor 10 and the heat sink through elastic sleeve 18 to the housing 15. The space 21 between the varistor and the housing wall serves for the passage of gas generated by the internal assembly during varistor failure. Since the heat contained within the varistor and metal heat sink must ultimately transmit to the housing for dissipation purposes the limit in the heat transfer efficiency of the configuration depicted in FIG. 3 is determined by the small contact area between the varistor metal heat sink assembly and the housing interior. This invention improves the heat transfer efficiency between the varistors and the housing by changing the configuration of the interior housing in order to substantially increase the contact angle between the varistor and the interior of the housing.

DESCRIPTION OF THE PREFERRED EMBODIMENT

Figure 4:
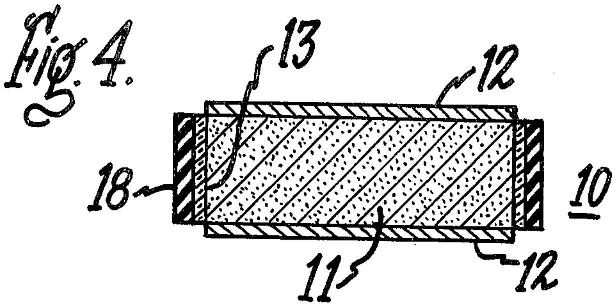
FIG 4 is a side sectional view of a sleeved zinc oxide varistor for use with the heat transfer assembly of the invention.
Figure 5:
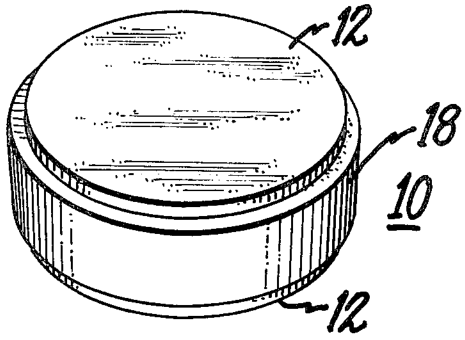
FIG. 5 is a top perspective view of the sleeved varistor of FIG. 4.

FIG. 4 shows a varistor 10 of the type similar to that depicted earlier in FIG. 1, containing a top and bottom electrode 12 on a sintered disc of zinc oxide material 11 and surrounded by a ceramic collar 13. The varistor further includes a circumferentially arranged sleeve 18 made of an elastic material such as silicone rubber. The purpose of the sleeve is to promote good thermal contact between the varistor 10 and the surrounding housing structure. Since the varistors are arranged within the porcelain housing without any intervening metal heat sink the sleeve 18 must not extend along the entire thickness of the varistor so that the top and bottom electrodes of one varistor are not prevented from contacting electrodes on neighboring varistors. This configuration is shown in FIG. 5.

Figure 6:
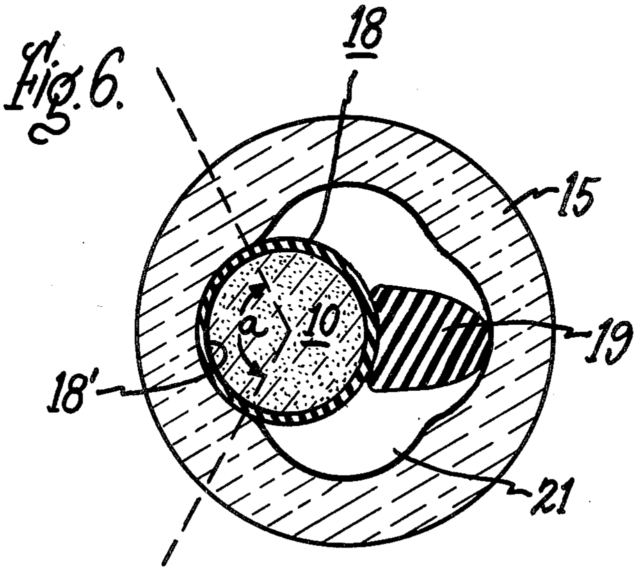
FIG. 6 is a cross sectional view of one embodiment of the heat transfer arrangement according to the invention.

FIG. 6 shows the heat transfer arrangement of the invention wherein a dual radius porcelain housing 15 contains a varistor 10 surrounded by the elastic sleeve 18 and contacts a positioner 19. The positioner interposed between one side of the porcelain housing 15 and one side of the varistor 10 forces the varistor into tight thermal contact with another portion of the housing. It is to be noted that the sleeve 18 is made from a flexible material that readily conforms to the inner housing when compressed, as shown in 18'. The provision of the dual radius interior of porcelain housing 15 will be discussed in greater detail below. The contact angle a is shown to contact a much greater surface of the modified porcelain housing than with the prior art arrangement shown in FIG. 3. This larger contact angle existing between the varistor and the modified porcelain housing allows varistors to operate without the provision of an additional metal heat sink and without the longer housing requirement called for with the prior art configuration.

Figure 7:
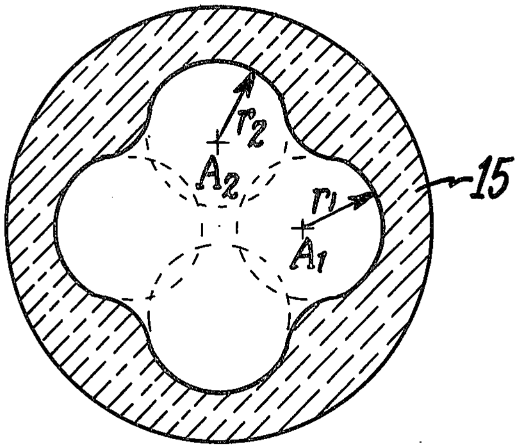
FIG. 7 is a cross sectional view of a two column surge arrester housing according to the invention.
Figure 7A:
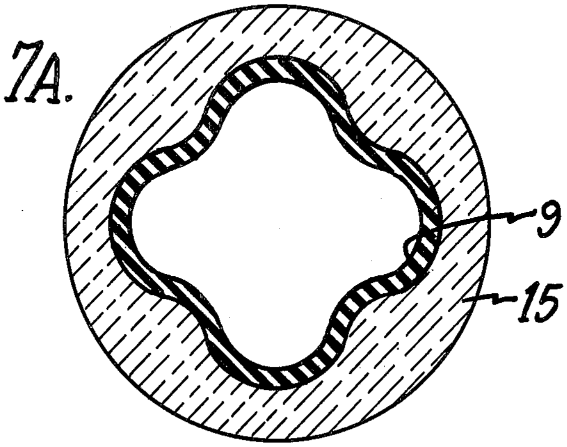
FIG. 7A is a further embodiment of the housing of FIG. 7 containing a coating of silicone resin.

FIG. 7 shows one embodiment of a dual radius arrester housing 15 for use with the heat transfer system of the invention. A first radius depicted by radius $r_1$ matches the approximate radius of the sleeved varistor to promote good contact with the housing. The first radius $r_1$ defines a first area $A_1$ within which the sleeved varistor is inserted. A second radius $r_2$ defining a second area $A_2$ provides for the passage of gas during varistor failure. A dual radius housing 15 having a coating of sleeve material 9 coated on the inner surface for use with unsleeved varistors is shown in FIG. 7A.

Figure 8:
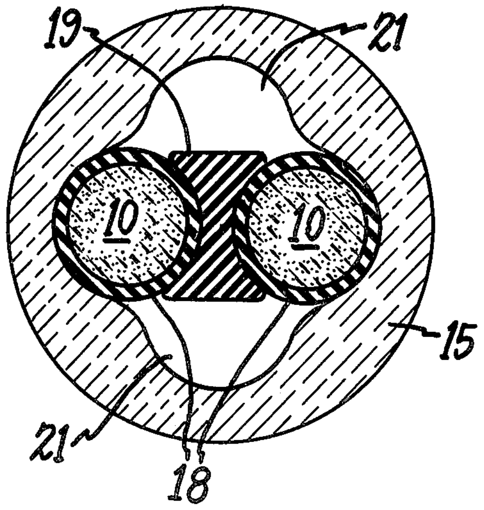
FIG. 8 is a cross sectional view of the arrester housing of FIG. 7 containing a pair of varistors.

The provision of opposing surfaces of the housing having a radius approximating the radius of a sleeved varistor allows two varistors to be stacked in a parallel array within the housing. This is shown in FIG. 8 wherein a pair of sleeved varistors 10 are positioned within the housing 15 and contain a positioner 19 to force the varistors against the housing. Each varistor contains an individual sleeve 18 which promotes the thermal transfer between the varistors and housing by filling the interstices existing between the outer perimeter of the varistor and the housing. Space 21 is provided, as described earlier, for the passage of gas generated by both varistors in the event of varistor failure.

Figure 9:
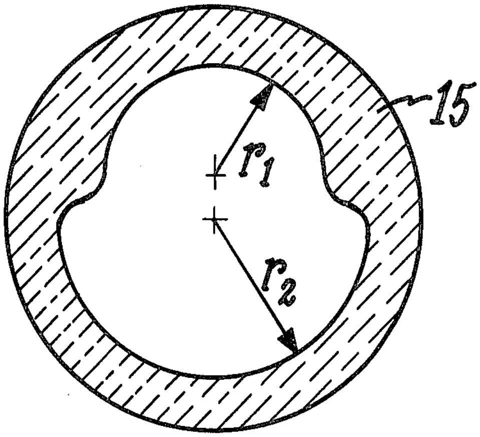
FIG. 9 is a further embodiment of the arrester housing according to the invention.
Figure 10:
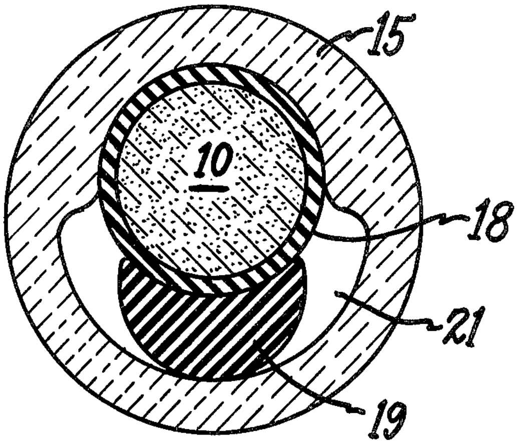
FIG. 10 is a cross sectional view of the embodiment of FIG. 9 containing a sleeved varistor.
Figure 11:
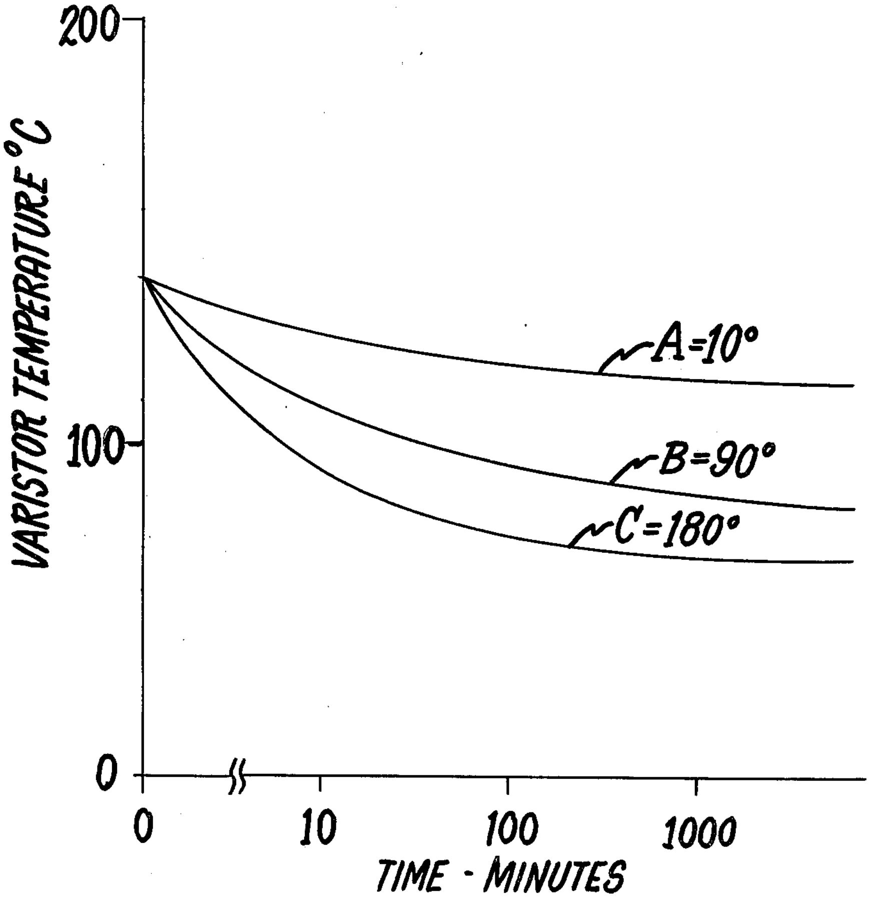
FIG. 11 is a graphic representation of the relationship between varistor temperature and time after a transient current surge for different included angles of contact with the varistor housing.

FIG. 9 shows a single varistor modified arrester housing 15 containing a first radius $r_1$ and a second radius $r_2$. The heat transfer assembly for the housing of FIG. 9 is shown in FIG. 10 and includes a varistor 10, elastic sleeve 18 and spacer 19. The spacer holds the varistor in good thermal contact with the portion of the varistor housing defined by radius $r_1$. The configurations depicted within the porcelain housings of FIGS. 6–9 can have varying degrees of contact angle a depending upon the thermal requirements of the varistors. The greater the contact angle the more efficient the heat transfer between the varistors and the housing. This is depicted in FIG. 11 wherein representative varistor cooling curves are generated by plotting the varistor temperature vs. time following a transient current surge. The temperature of a varistor within the arrester housing providing a contact angle of 10° between the varistor and the housing is shown at A. It can be seen that the varistor temperature, after a surge that is within the thermal capability of the varistor, approaches a constant steady state temperature. The line voltage across the varistor in combination with the varistor current determines the varistor watts loss under steady state conditions which in turn determines the varistor temperature.

As described in the aforementioned U.S. Patent Application, the critical operating sequence of a ZnO surge arrester involves a transient current surge followed by the steady state system voltage. Since the arrester is subjected to additional energy input from the surge, it must be able to withstand an elevated wattage and temperature upon returning to the system voltage. If no heat transfer means were employed, the varistor temperature and watts could continuously increase to such an extent that the varistor reaches a thermal runaway condition. Therefore the faster that heat is removed from the varistor the lower the possibility of the occurence of thermal runaway. Varistors having a contact angle of 90° as shown at B, cool more rapidly than varistors having a 10° contact angle. Varistors having a contact angle of 180° as shown at C approach the steady state operating temperature at an even greater rate. FIG. 11 shows therefore, that the greater the degree of contact angle between the sleeved varistor and the arrester housing the more effective the heat transfer from the sleeved varistor to the arrester housing. As described earlier it is extremely important to cool the varistor rapidly because it is necessary to reduce the time that the varistor is exposed to a temperature close to the condition of thermal runaway. This is further important because of the possibility of repetitive transient surges occurring while the varistor is still at an elevated temperature. An ideal situation would be for varistors having a contact angle of 360°. This is not feasible however, due to the requirements of providing some volume for the release of gases generated in the event of varistor failure.

Figure 10A:
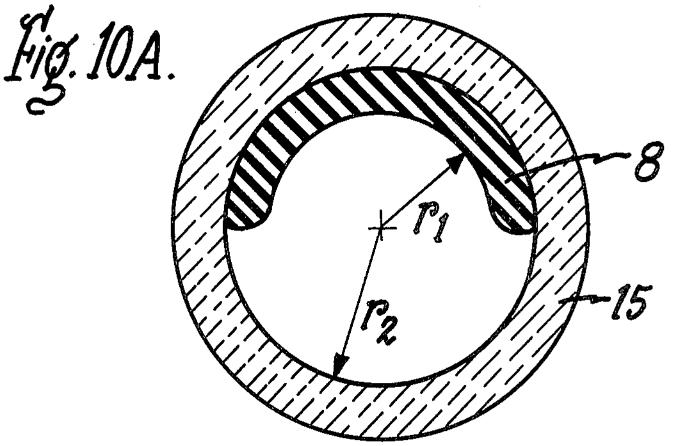
FIG. 10A is a cross sectional view of an arrester housing having a modified geometry according to the invention.

The dual radius modifications to the arrester housing were made on porcelain type arresters although other insulating materials may be used to form the arrester housing. The housing can be cast or extruded from silicone resin or from other electrically insulating resins such as epoxy. It is further within the scope of this invention to modify the interior geometry of a standard uniformly circular arrester housing by coating or inserting some means to provide for large contact angles between the sleeved varistors and the housing interior. A housing 15 having a quantity of silicone material 8 on the inner surface to modify the interior geometry is shown in FIG. 10A. Although the spacers depicted in FIGS. 6, 8 and 10 comprise a silicone resin similar to that employed for the sleeves, other electrically insulating and flexible materials can also be employed. In some applications it may be more convenient to apply a coating of thermally conductive and electrically insulating material to the entire perimeter of the varistor in place of the elastic sleeve or to apply the material only in the vicinity of the varistor that is in contact with the arrester housing.

The heat transfer system of the invention is disclosed for surge voltage arresters as one example. However the heat transfer system of the invention can be used whenever surge voltage devices may be employed.

What I claim as new, and desire to secure by Letters Patent in the United States is:

1. A heat transfer arrangement for voltage surge arresters comprising:

an electrically insulated housing having a passageway extending there through and defined by a dual radius configuration, the first radius conforming to the radius of a zinc oxide varistor within the housing and the second radius providing a gas transfer space; and heat transfer means intermediate the varistor and a housing wall for conducting heat away from the varistor into the housing wall.

2. The heat transfer arrangement of claim 1 further including a positioning member for forcing the varistor and thermal transfer means into contact with the housing wall.

3. The heat transfer arrangement of claim 1 wherein opposing surfaces on the interior of the housing are formed with the first radius.

4. The thermal transfer system of claim 1 wherein the thermal transfer means comprises a flexible sleeve surrounding the varistor.

5. The heat transfer arrangement of claim 4 wherein the flexible sleeve comprises a silicone resin.

6. The heat transfer arrangement of claim 2 wherein the positioning member comprises a body of silicone resin.

7. The arrangement of claim 3 wherein a pair of first and second varistors is positioned within the opposing surfaces on the interior of the housing defined by said first radius.

8. The arrangement of claim 7 wherein the varistors contact the housing to define a contact angle ranging from 10° to 180°.

9. The heat transfer arrangement of claim 1 wherein the heat transfer means comprises a coating of thermally conducting electrically insulating material on a portion of the varistor.

10. The arrangement of claim 1 wherein the heat transfer means comprises a layer of thermally conductive and electrically insulating material applied to the interior of the arrester housing.

11. A housing for voltage surge arresters comprising:

a body of electrically insulating material having a passageway extending through the body, said passageway defined by a first and a second radius, said first radius corresponding to the diameter of a zinc oxide varistor and said second radius providing a passageway for the escape of gases.

12. The housing of claim 11 wherein the material is selected from the group consisting of porcelain, silicone and epoxy.

* * * * *